Patented Aug. 10, 1943

2,326,727

UNITED STATES PATENT OFFICE 2,326,727

ACCELERATOR OF THE DELAYED ACTION TYPE AND ACID-CURING THERMOSETTING RESIN

Paul C. Schroy, Stamford, Conn., assignor to American Cyanamid Company, New York, N. Y., a corporation of Maine No Drawing. Application July 4, 1939, Serial No. 282,819

14 Claims. (Cl. 260—71)

This invention relates to substantially stable compositions containing acid-curing thermosetting resins, and is especially directed to such compositions which include suitable curing catalysts. It also relates to the production of the curing catalysts.

Most of the catalysts which have been previously proposed for use with acid-curing thermosetting resins cause such resins to partially or wholly cure at relatively low temperatures. If compositions containing such catalysts, together with an uncured acid-curing thermosetting resin be stored, the resin may be partially or wholly cured even at normal temperatures. This results in loss of utility for most purposes. Furthermore, if it be desirable to subject the composition containing the resin and catalyst to preliminary mild heat without curing as may be necessary in many operations, such as textile treating, impregnating, laminating, etc., then it is preferable to use a curing catalyst which is relatively inactive at low temperatures but which will cure the resin readily at somewhat higher temperatures.

One object of this invention is to provide catalysts or accelerators for acid-curing thermosetting resins which will cure such resins rapidly only at relatively high temperatures. Another object of this invention is to provide catalysts which will cure acid-curing thermosetting resins at relatively high polymerizing temperatures e. g. at least about 135° C.

Still another object of this invention is to provide catalysts which will not cure compositions containing acid-curing thermosetting resins appreciably at room temperatures or at slightly elevated temperatures. A further object of this invention is to provide catalysts which will stabilize syrups containing acid-curing thermosetting resins at normal storage temperatures.

These and other objects are attained by employing as a catalyst a reaction product of a tertiary amine and more especially a tertiary alkylol amine with an acid.

The following examples of the practice of my invention are given by way of illustration and not in limitation.

Example 1

|  | Parts by weight |
|---|---|
| Phthalic anhydride | 148 |
| Triethanolamine | 298 |
| Water | 184 |

The phthalic anhydride is dissolved in the water and the triethanolamine is added to the solution slowly at not over about 65° C. In small batches this addition is conveniently spaced over a period of about one hour. An exothermic reaction occurs during this addition and will generally supply sufficient heat to maintain the mixture at reaction temperature i. e. about 60°–65° C. The reaction temperature is maintained and if necessary an external source of heat may be applied until a homogeneous reaction product is formed. The product is then cooled and is a substantially neutral, viscous liquid. This product is mixed with an acid-curing thermosetting resin composition e. g. a urea-formaldehyde resin syrup. This syrup may be applied to textile materials for various applications or it may be used to impregnate fillers for use in molding compositions or for many other uses. The compositions containing the resin and catalyst do not cure appreciably below about 135° C. and at 137° C. the cure is slow. On the other hand a rapid cure is obtained at temperatures of 140°–150° C. or higher.

Example 2

|  | Parts by weight |
|---|---|
| Triethanolamine | 32–33 |
| The catalyst made according to Example 1 | 68–67 |

The triethanolamine is added slowly to the catalyst made according to Example 1, the temperature being maintained preferably at about 65° C. The reaction is continued at about 60°–65° C. until a homogeneous product is obtained. The product is a very viscous liquid which is substantially neutral although somewhat more basic than the product of Example 1. This catalyst may be used in the same general manner as the catalyst prepared according to Example 1 and it cures acid-curing thermosetting resins at about the same temperatures although the rate of cure is somewhat slower. On the other hand ureaformaldehyde syrups containing about 1%–3% of this catalyst are much more stable at room temperatures than syrups not containing any accelerator or one of the ordinary types of acidic catalyst. Such compositions are also slightly more stable than those prepared with catalysts such as the product of Example 1.

Example 3

|  | Parts by weight |
|---|---|
| Phosphoric acid (85% $H_3PO_4$) | 258 |
| Triethanolamine | 500 |
| Water | 242 |

The acid is dissolved in the water and the triethanolamine is added slowly to the solution. The reaction temperature is maintained at about 60°–70° C. and the reaction is continued at this temperature until a homogeneous product is obtained. The substantially neutral, viscous product may be used as an accelerator in the same general manner as described in Example 1 with similar results.

*Example 4*

|  | Parts by weight |
|---|---|
| Tartaric acid | 251 |
| Triethanolamine | 500 |
| Water | 249 |

The acid is dissolved in the water and the triethanolamine is added slowly to the solution. The reaction temperature is maintained at about 60°–70° C. and the reaction is continued at this temperature for one half to one hour, or until a homogeneous product is obtained. The pH of the product is about 7 when diluted with water. This catalyst may be used in the same general manner as described in Example 1 with similar results. A catalyst of this type is particularly useful in those applications where buffering is desired.

Other tertiary amines may be used in place of triethanolamine. Among these the tertiary alkylol amines have been found to be particularly suitable. It is especially desirable that the tertiary amines having relatively high boiling points, preferably at least about 135° C., be used. The reaction products of acids with the tertiary amines having relatively high boiling points are generally more stable at high temperatures and have better curing characteristics for certain purposes than those produced from the tertiary amines having relatively low boiling points. The alkylol amine reaction products are especially suitable for use in aqueous syrups of the thermosetting resins since they are usually more compatible with the syrups than the reaction products of the other tertiary amines. Furthermore, the alkylol amine reaction products may react with the resin at the curing temperature or they may dissolve therein to produce a homogeneous final product. Among the amines which are suitable for practice of my invention the following are included: dimethylaminoethanol (B. P. 135° C.), diethylaminoethanol, phenyldiethylamine, ethylphenylethanolamine, tri-isopropanolamine, tripropanolamine, dimethyl-cyclohexylamine, diethyl-cyclohexylamine, N-dimethylaniline, N-diethylaniline, tripropylamine, triamylamine, tri-isoamylamine, etc. Obviously various mixtures of tertiary amines may be employed in order to obtain the characteristics desired for any particular application.

Other organic acids may be used in place of phthalic acid or tartaric acid and other inorganic acids may be used in place of phosphoric acid. Among these the following are included propionic acid, benzoic acid, oxalic acid, alpha-hydroxy isobutyric acid, etc. Various mixtures of any of these or other acids may also be used. The acid selected will depend somewhat on the desired degree of buffering effect and on the rate of cure desired. The term "acid" as used herein is intended to include the anhydride as well as the acid itself since either may be used according to convenience and availability although if the anhydride be used, it is dissolved in water, thereby forming the acid before it is reacted with the amine.

The reaction of triethanolamine with the acid is preferably carried out between about 60°–70° C. although lower temperatures of reaction may be used if desired. Reaction temperature will usually be reached merely by the heat of the exothermic reaction but additional heat may be supplied if necessary. The reaction is also preferably carried out in an aqueous medium.

The reaction products obtained are substantially neutral. A pH between about 6 and 8 is considered to be "substantially neutral" as the term is used herein. Ordinarily, however, the reaction product will have a pH much closer to 7 than either of these extremes. If the pH of the product be between about 6 and 7, it will not be sufficiently acid to effect any substantial cure of the resin except very slowly.

The reaction products obtained with primary alkylol amines, e. g. monoethanolamine and various acids such as phthalic acid do not have the delayed action characteristics which are possessed by the reaction products of the tertiary alkylol amines, e. g. triethanolamine with the various acids. The monoethanolamine derivatives cure rapidly at relatively low temperatures and, therefore, are not generally as well suited for use as, for example, in textile treating applications as the triethanolamine derivatives which cure only at relatively high temperatures. On the other hand, if it be desirable to speed up the action of the triethanolamine derivatives described above, it may be desirable to substitute a small proportion of monoethanolamine for an equivalent portion of the triethanolamine in the preparation of the catalyst. Furthermore, monopreparation of the catalyst. Furthermore, monoethanolamine or other monoalkylol amine may be reacted with an acid separately and then mixed with the reaction product of triethanolamine with the same or a different acid.

Catalysts or accelerators made according to my invention are useful for curing acid-curing thermosetting resins. The term "acid-curing thermosetting resin" includes those resins which may be cured only under acid conditions and also those which may be cured under either acid or alkaline conditions. Such resins include those obtained by reacting an aldehyde, e. g. formaldehyde, acetaldehyde, benzaldehyde, etc. with one or more of the following: urea, thiourea, the reaction products obtained by heating and decomposing dicyandiamide, melamine, other aminotriazines, phenol, other phenols such as the alkyl phenols, etc. Mixed resins e. g. urea-melamine-formaldehyde resins, urea-thiourea-formaldehyde resins, etc. may be prepared by reacting the aldehyde with each of the other reactants separately or the aldehyde may be reacted with a mixture of other reactants. Mixed resins containing from about 20%–60% melamine-formaldehyde resin and the remainder urea-formaldehyde resin are especially useful.

Usually only a small portion of catalyst is necessary to produce rapid cures, e. g. 1%–5% and preferably about 3%. Obviously in many cases smaller or larger proportions of catalysts may be used.

Catalysts of the delayed action type as described herein are particularly suitable for use in laminating syrups, textile treating syrups, adhesives, etc. which contain acid-curing thermosetting resins. They may also be used in molding powders or in solid compositions which have been prepared for hot pressing into sheets, rods, bars, etc.

Various fillers may be used in the resinous compositions if desirable. Among these are cellulose pulp, wood flour, asbestos, cotton linters, clay, etc. Furthermore, coloring materials may be included if desired. In some applications it may be desirable to add modifying agents such as starches, gums, alginates, casein, etc. Plasticizing agents, e. g. N-ethanol toluene sulfonamide, alkyd resins, polyhydric alcohols, etc. may be incorporated in the compositions for some applications.

Obviously many modifications and variations in the processes and compositions described above may be made without departing from the spirit and scope of the invention as defined in the appended claims.

I claim:

1. A composition comprising an acid curing thermosetting resin and a small amount of a product substantially identical with that obtained by reacting a tertiary monoamine with an acid at a temperature not over about 60–70° C.

2. A composition comprising an acid curing thermosetting resin and a small amount of a product substantially identical with that obtained by reacting triethanolamine with an acid at a temperature not over about 60–70° C.

3. A composition comprising an acid curing thermosetting resin and a small amount of a product obtained by reacting in water a tertiary monoamine with an acid.

4. A composition comprising an acid curing thermosetting resin and a small amount of a product obtained by reacting in water an organic acid and a tertiary monoamine having a boiling point of at least about 135° C.

5. A composition comprising an acid curing thermosetting resin and a small proportion of a substantially neutral product obtained by reacting in water a tertiary monoalkylol amine and an organic acid.

6. A composition comprising an acid curing thermosetting resin and a small amount of the product obtained by reacting in water triethanolamine with an acid.

7. A composition comprising an acid curing thermosetting resin and a small proportion of a substantially neutral product obtained by reacting in water triethanolamine and phthalic acid.

8. A composition comprising a urea-formaldehyde resin and a small proportion of a substantially neutral product obtained by reacting in water triethanolamine and phthalic acid.

9. A composition comprising a melamine-formaldehyde resin and a small proportion of a substantially neutral product obtained by reacting in water triethanolamine and phthalic acid.

10. A composition comprising a melamine-urea-formaldehyde resin and a small proportion of a substantially neutral product obtained by reacting in water triethanolamine and phthalic acid.

11. A composition comprising an acid curing thermosetting resin and a small amount of a product obtained by reacting in water triethanolamine and tartaric acid.

12. A process of curing an acid curing thermosetting resin which comprises adding to such a resin a substantially neutral product obtained by reacting in water an acid with a tertiary monoamine and subjecting the admixture to a temperature of at least about 135° C.

13. A process of curing an acid curing thermosetting resin which comprises adding to such a resin a substantially neutral product obtained by reacting in water an acid with triethanolamine and subjecting the admixture to a temperature of at least about 135° C.

14. A process of curing an acid curing thermosetting resin which comprises adding to such a resin a substantially neutral product obtained by reacting in water phthalic acid with triethanolamine and subjecting the admixture to a temperature of at least about 135° C.

PAUL C. SCHROY.